United States Patent [19]
Lacy et al.

[11] Patent Number: 5,410,864
[45] Date of Patent: May 2, 1995

[54] MOWING APPARATUS ADAPTED TO BE TOWED BY A PEDAL-OPERATED VEHICLE AND THE LIKE

[76] Inventors: Thomas C. Lacy, P.O. Box 185; Kenneth L. Shackles, Jr., P.O. Box 111, both of Silverthorne, Colo. 80498

[21] Appl. No.: 134,418

[22] Filed: Oct. 8, 1993

[51] Int. Cl.⁶ .......................................... A01D 34/07
[52] U.S. Cl. ............................... 56/2; 56/16.7; 56/198; 56/249; 280/7.15
[58] Field of Search ................. 56/14.8, 16.4–16.7, 56/DIG. 9, 198, DIG. 14, 249, 2, 17.4; 280/7.1, 7.15; 403/93, 97

[56] References Cited

U.S. PATENT DOCUMENTS

| | | | |
|---|---|---|---|
| 613,834 | 11/1898 | Burnet | 56/198 |
| 1,561,569 | 4/1922 | Roseman | 56/249 |
| 1,713,396 | 5/1929 | Roundtree | 56/16.7 |
| 1,834,964 | 12/1931 | Nichols | 56/249 |
| 4,341,058 | 7/1982 | Chun | 56/2 |
| 4,344,639 | 8/1982 | Pollard | 280/411 C |
| 4,455,816 | 6/1984 | Porath | 56/249 |
| 4,876,845 | 10/1989 | Sturgill | 56/6 |
| 4,917,343 | 4/1990 | Wainscott | 248/447.2 |
| 5,291,724 | 3/1994 | Cotton | 56/251 |

*Primary Examiner*—Ramon S. Britts
*Assistant Examiner*—Pamela A. O'Connor
*Attorney, Agent, or Firm*—Timothy J. Martin

[57] ABSTRACT

A mowing apparatus is provided by a reel-type or rotary mower towed by a vehicle, such as a bicycle, by a draw bar adapted to mount onto existing mower brackets and onto the vehicle by a connector that mounts to a frame element of the vehicle. The draw bar includes a resilient element that preferably permits flexing relative to the vehicle so that the mower articulates relative to the vehicle and so that a normal load force may be applied to the mower. The connector is preferably adjustable to allow selective variance in the load force applied. The draw bar may be a single arcuate piece utilizing a spring as the resilient element. Alternatively, the draw bar may be one or a pair of stiff, yet resilient arms. A guard portion may be provided as an extension of the draw bar or as an auxiliary piece, and a grass shield may be employed.

29 Claims, 6 Drawing Sheets

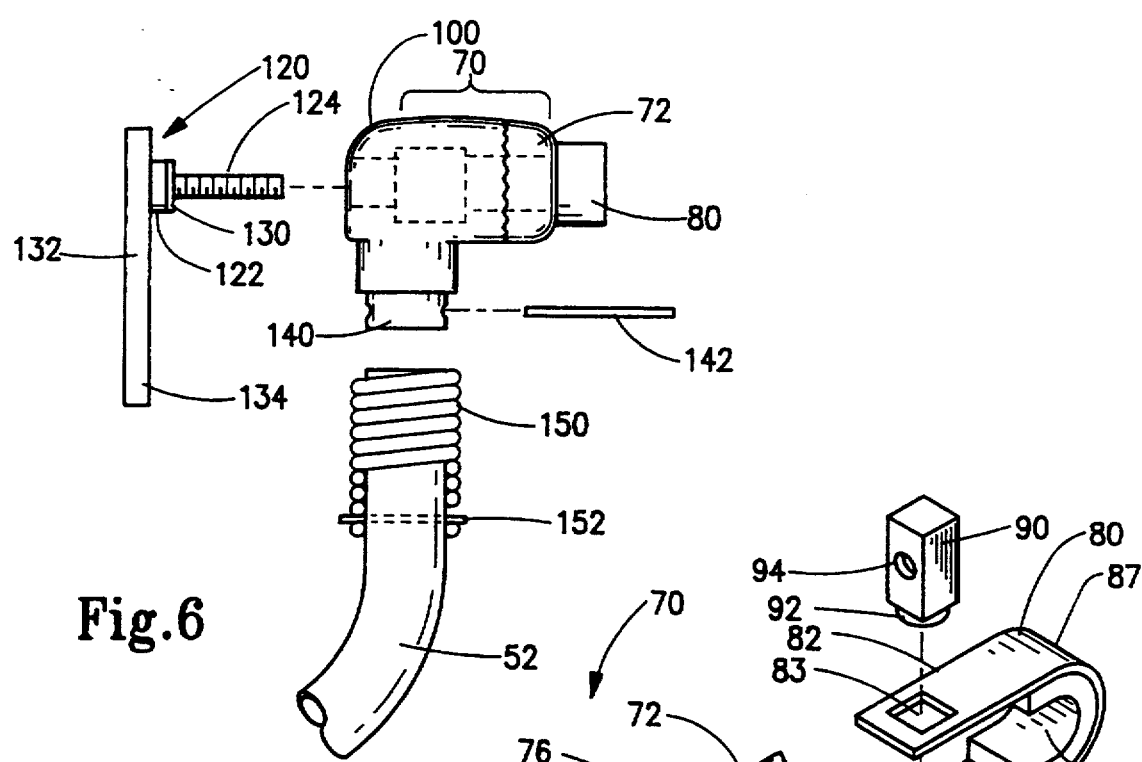
Fig.6
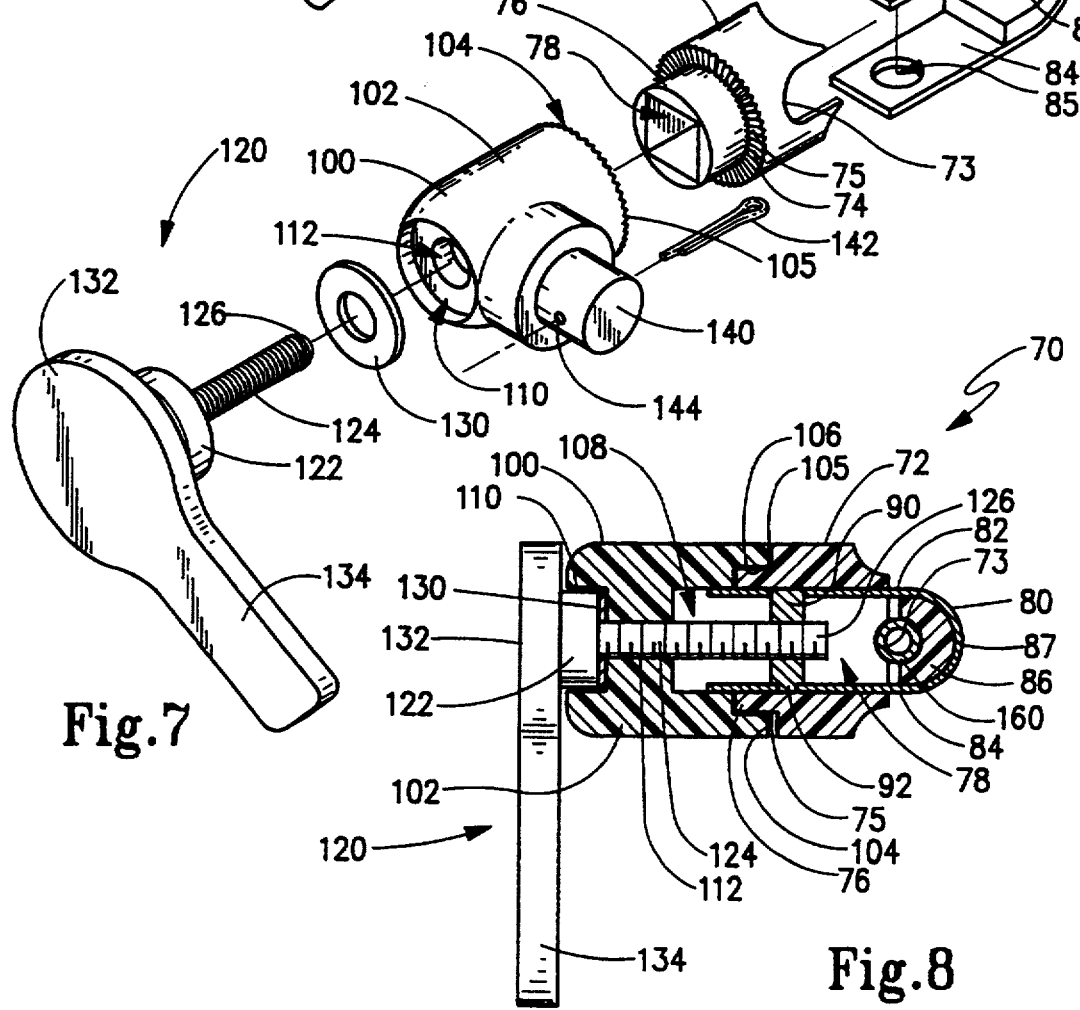
Fig.7
Fig.8

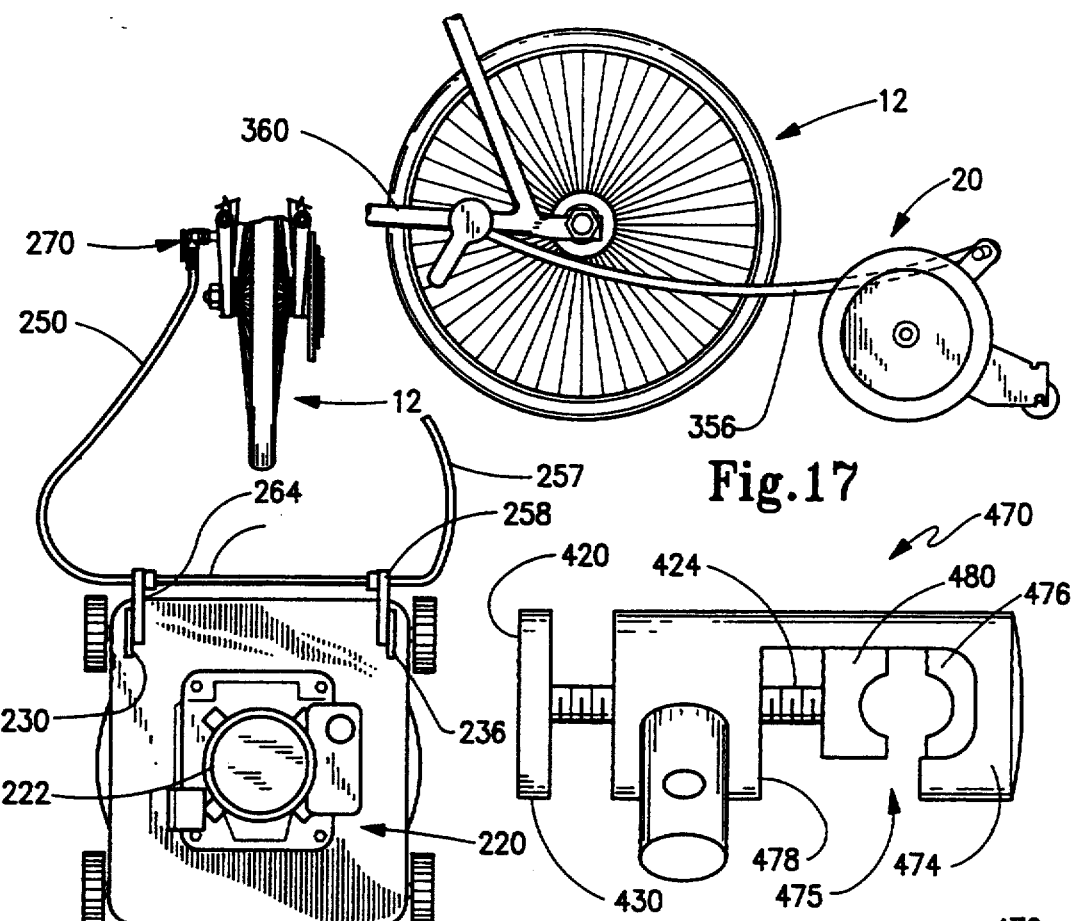
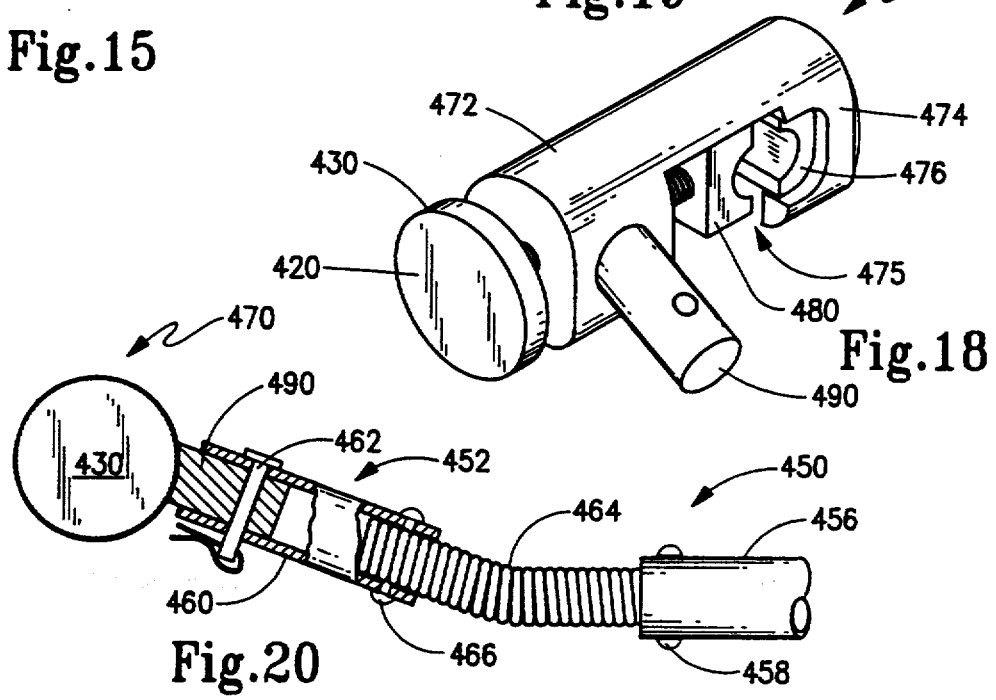

MOWING APPARATUS ADAPTED TO BE TOWED BY A PEDAL-OPERATED VEHICLE AND THE LIKE

FIELD OF THE INVENTION

The present invention generally relates to mowing apparatus adapted to be towed by a vehicle, especially a pedal operated vehicle, in order to mow vegetation on the vegetated surface. In particular, the present invention concerns a draw-bar structure operative to interconnect the frame of a standard bicycle with a mowing apparatus, such as a conventional reel-type or rotary mower.

BACKGROUND OF THE INVENTION

It has become traditional to landscape grounds surrounding both communities and individual dwelling areas with vegetation and, in particular, it has become commonplace to use vegetated surface areas comprising grass or other ground coverings. Many of these vegetated surfaces are of the type that require periodic mowing in order for the surface to appear neat and well-maintained. Not only does periodic mowing make for a neater appearance, but also the resulting trimmed ground covering provides a more pleasant surface for leisure activities for children and adults alike.

Because of the need to periodically mow vegetated surfaces, a variety of different mowing apparatus have historically been developed. In modern times, two primary forms of mowing apparatus are prevalent. A first type, the reel-type mower, utilizes a plurality of sickle-like blades, each of which is curved along the cylindrical surface of an imaginary cylinder between brackets that are journaled for rotation on the longitudinal axis of the cylinder. The sickle blades are oriented transversely to the direction of travel of the mowing apparatus as it is advanced across the surface. As the group of sickle blades rotate, each blade is consecutively spun downwardly towards the vegetation and across the vegetated surface so that the vegetated surface is mowed in a plane tangential to the imaginary cylinder. While reel-type mowers may be power driven, they are typically hand operated with a pair of ground engaging wheels supporting the sickle blades for rotation and a gear assembly provided so that rotation of the wheels across the surface impart rotation to the sickle blades through a shaft connected to the gear assembly. An example of a reel-type mower is found in U.S. Pat. No. 1,834,964 issued Dec. 8, 1931 to Nichols.

A second type of mowing apparatus is commonly referred to as a rotary-type mower. Here, one or more blades are rotated in a housing that is supported by wheels on the support surface. Each blade is relatively flat in appearance and is spun in a plane that is parallel to the surface. End edge portions of the blades are sharpened to sever the vegetation as the mower is advanced across the vegetated surface. Usually, the rotary blades are power driven by a gasoline engine or an electric motor, and the mower apparatus itself may be either pushed or propelled by the motive source. In some instances where the unit is power driven, the operator rides on a seat provided on the mowing apparatus.

Heretofore, it has been recognized that a mowing apparatus may be propelled by a pedal operated vehicle such as a bicycle, tricycle and the like. Notwithstanding such recognitions, use of pedal driven mowing apparatus has not gained wide-spread acceptance. Recent interest by the population in increased physical exercise coupled with revived interests in bicycles and an increased awareness of the impact of activities on the environment all suggest that the use of pedal operated mowing apparatus be revisited.

Examples of pedal-operated reel-type mowing apparatus are found in U.S. Pat. No. 613,834 issued Nov. 8, 1898 to Burnet and in U.S. Pat. No. 1,713,396 issued May 14, 1929 to Rountree. In the Burnet patent, a reel-type mower is located between front and rear axles of a tricycle assembly. The pedal assembly drives the rear axle on which a pair of drive wheels are located. A second chain drive extends forwardly from the axle to the reel-type cutter which is suspended from the handlebars of the vehicle by means of a chain. The Rountree patent discloses a pedal operated vehicle having a pair of rear wheels with a pair of front wheels being provided by a reel-type mowing apparatus. The pedal assembly operates the rear wheels through a first chain drive and a second chain drive extends forwardly to interconnect to a shaft provided with a bevel gear that drives an incline shaft which extends forwardly to a differential that provides the drive power for the reel-type mower.

A more recent attempt at developing pedal operated mowers is shown in U.S. Pat. No. 4,455,816 issued Jun. 26, 1984 to Porath. This patent discloses a reel-type mower mounted on a transverse axle extending between a rear pair of wheels on a tricycle frame. A chain drive interconnects the wheel axle and a pedal assembly so that the operator, who sits on a seat on the tricycle frame, may operate the pedal apparatus which, through the chain drive, rotates the drive axle for the rear wheels. Rotation of the drive axle also rotates the sickle blades of the reel-type mower.

Finally, in U.S. Pat. No. 4,341,058 issued Jul. 27, 1982 to Chun, a rotary-type mower is shown to be driven by an exercycle-type bicycle. Here, the pedal assembly both drives a rear wheel while at the same time operates a bevel gear drive for a vertically extending drive shaft of a rotary mower that is suspended between the front and rear wheels of the bicycle assembly. A pair of minor wheels may be moved into and out of position to transform the mowing apparatus into a stationary-type exercise bicycle.

It may be appreciated from a review of these existing mowing apparatus that each is constructed so as to be a specialized piece of equipment. Thus, each requires somewhat bulky storage when not in use and, with the exception of the Chun apparatus which is designed to be an exercise unit, is only used on the isolated periodic occasions when a vegetated surface is to be mowed. It would be far superior to provide a mowing apparatus which could quickly and easily be attached to and removed from an existing bicycle so that, when not being used to mow a vegetated surface, the apparatus could be conveniently stored while the bicycle could remain useful for normal cycling activities. Furthermore, such a retro-fit structure can be more economical to produce since it would be unnecessary to manufacture the cycle vehicle assembly as part of the device by relying on the wide-spread availability of existing cycle vehicle, such as the common bicycle. Furthermore, it would be advantageous if such a unit were able to adapt to existing mowers without the need for modification.

SUMMARY OF THE INVENTION

It is an object of the present invention to provide a new and useful mowing apparatus that incorporates the conventional bicycle and a conventional mowing assembly by means of a draw-bar that quickly and easily attaches and detaches from both the mowing assembly and the cycle vehicle frame.

A further object of the present invention is to provide an inexpensive mowing apparatus which uses a conventional reel-type mower which may be attached to a bicycle by means of a releasable draw-bar and which also may detach from the draw-bar for hand operation, if desired.

Yet another object of the present invention is to provide a mowing apparatus that may be towed by a pedal powered vehicle which permits the turning of the vehicle, either to the left or right, about a relatively short radius.

Still a further object of the present invention is to provide a retro-fit mowing apparatus which is small and compact for storage yet which may readily attach to the frame of a cycle vehicle.

According to the present invention, then, a mowing apparatus is provided to mount onto a frame member of a pedal-operated vehicle such as a bicycle, tricycle and the like. Broadly, the mowing apparatus includes a mower assembly which may be towed by a draw-bar connected to the vehicle by means of a connector mounted onto a frame member thereof. The mower assembly may thus be advanced by the vehicle along a line of travel on a vegetated support surface in order to cut vegetation. The draw-bar includes a resilient element which is operative to promote flexing of the draw-bar relative to the vehicle.

Preferably, the mower assembly is a reel-type mower which includes a pair of spaced-apart wheels which are separated by and supported by a mower frame which also rotatably mounts cutting elements. The draw-bar is arcuate in shape so as to include a transverse distal portion having a pair of spaced-apart brackets that mount to the standard mounts onto the reel-type mower. An arcuate central section curves around the mower wheels so as not to interfere with movement thereof, and the central section terminates in a proximal portion that may be releasably connected to a selected frame element of the pedal-operated vehicle. A spring element is provided at the proximal end portion of the draw-bar and is secured to the connector. The connector, in turn, allows for adjustable positioning of the draw-bar whereby a load force may be selectively applied on the mower assembly by pre-stressing the spring element. This may be accomplished by having a connector perform as a two-part construction with each section being relatively rotatably to the other and provided with interlocking teeth to be locked into a selected position. A spring element also permits articulation of the mower out of the line of travel of the vehicle. Furthermore, the connector may be formed as a clamp assembly which permits the releasable attachments to the vehicle.

In one embodiment, the central portion of the draw-bar is separate from the proximal end portion thereof. Here, the proximal end portion is in the form of a tubular sleeve that telescopically receives one end of the resilient element which is in the form of a coil spring. The other end of the coil spring is telescopically received in the tubular central section so that the spring element interconnects the proximal end portion and the central portion of the draw-bar. The sleeve which forms the proximal end portion of the draw-bar may be releasably fastened to the connector which, if desired, may be left mounted on the frame of the vehicle.

In another alternative exemplary embodiment, a draw-bar is in the form of a stiff, yet resilient bar which fastens to the connector and extends rearwardly from the vehicle to mount onto the mower assembly. Here, a transverse bar may be provided with brackets which attach to the normal connections of the mower assembly, and a pair of longitudinally extending stiff, yet resilient bars may be attached to extend forwardly to opposite sides of the vehicle, such as the rear wheel of a bicycle.

A powered rotary mower may be used in place of the reel-type mower, if desired, although the preferred embodiment includes a reel-type mower assembly. Furthermore, a guard portion may be provided to protect the mower assembly from contact with objects during operation, either in the form of a continuous extension of the draw bar or as an auxiliary piece releasably securable to the draw bar. An auxiliary shield may also be provided with the shield attaching to the draw-bar and positioned to deflect cut vegetation during use.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 6 is a top plan view, partially exploded and partially in cross-section, showing the forward portion of the draw-bar of FIGS. 1 and 2;

FIG. 7 is an exploded perspective view of the connector used to interconnect the proximal portion of the draw-bar of FIGS. 1, 2 and 6 to a pedal-powered vehicle;

FIG. 8 is a side view in cross-section of the connector of FIG. 7 shown assembled and fastened to a frame element;

FIG. 15 is a top plan view of the alternative exemplary embodiment shown in FIG. 14;

FIG. 17 is a side view in elevation showing attachment of a reel-type mower to a bicycle frame using the draw-bar of FIG. 15;

FIG. 18 is a perspective view of an alternative embodiment of the connector;

FIG. 19 is a side view in elevation of the connector shown in FIG. 18; and

FIG. 20 is an end view in elevation of the connector shown in FIGS. 18 and 19 secured to the proximal end of an alternative draw-bar construction.

DETAILED DESCRIPTION OF THE EXEMPLARY EMBODIMENTS

The present invention is directed to a mowing apparatus that may be used to mow or cut vegetation on a vegetated surface, such as lawns which surround private dwellings and commercial buildings. Specifically, however, the present invention is directed to 14 mowing apparatus which may be towed behind a pedal operated cycle vehicle, such as a bicycle, tricycle and the like. Since the present invention is constructed to allow a conventional pedal powered cycle vehicle to be employed with a conventional-type mowing apparatus, the invention specifically concerns a draw-bar assembly to allow such interconnection.

Figure 1:
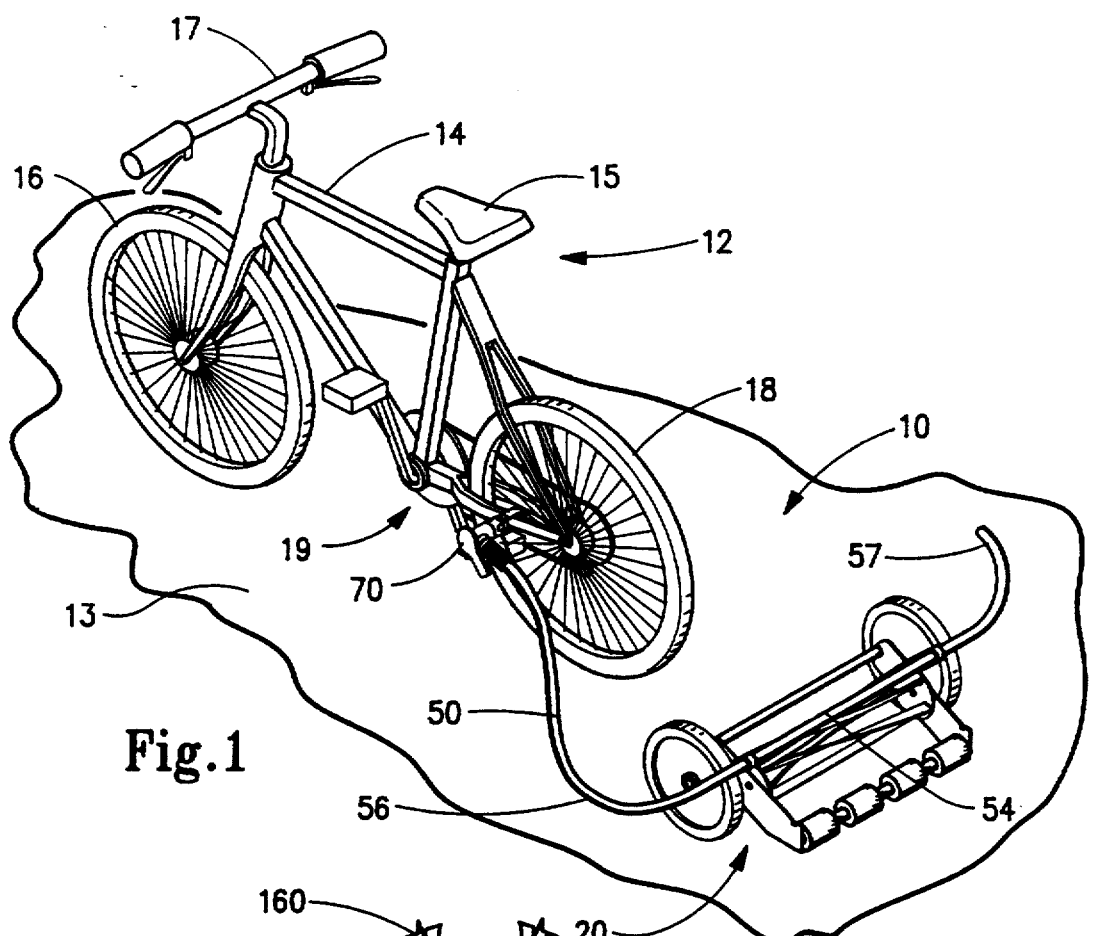
FIG. 1 is a perspective view of the mowing apparatus according to a first exemplary embodiment of the present invention shown attached to a conventional bicycle.

A representative first exemplary embodiment of the present invention therefore, is shown in FIGS. 1-8 wherein mowing apparatus 10 is shown connected to a pedal powered bicycle 12 although it should be understood that the present invention could be used with other types of vehicles, such as tricycles, mopeds, etc., both human and mechanically powered. For purposes of explanation, it may be seen that bicycle 12 includes a frame 14 which rotatably supports a front wheel 16 and a rear rear wheel 18, a seat 15 and handlebars 17 for steering the bicycle. A chain driven pedal and gear assembly 19 provides motive power to bicycle as it is advanced over a support surface, such as vegetated support surface 13. As shown in FIG. 1, a mowing assembly 20 is adapted to be towed by bicycle 12 by means of a draw-bar 50 mountable at a rearward portion to mowing assembly 20 and at a forward position to a frame element of frame 14 by means of a connector 70.

Figure 2:
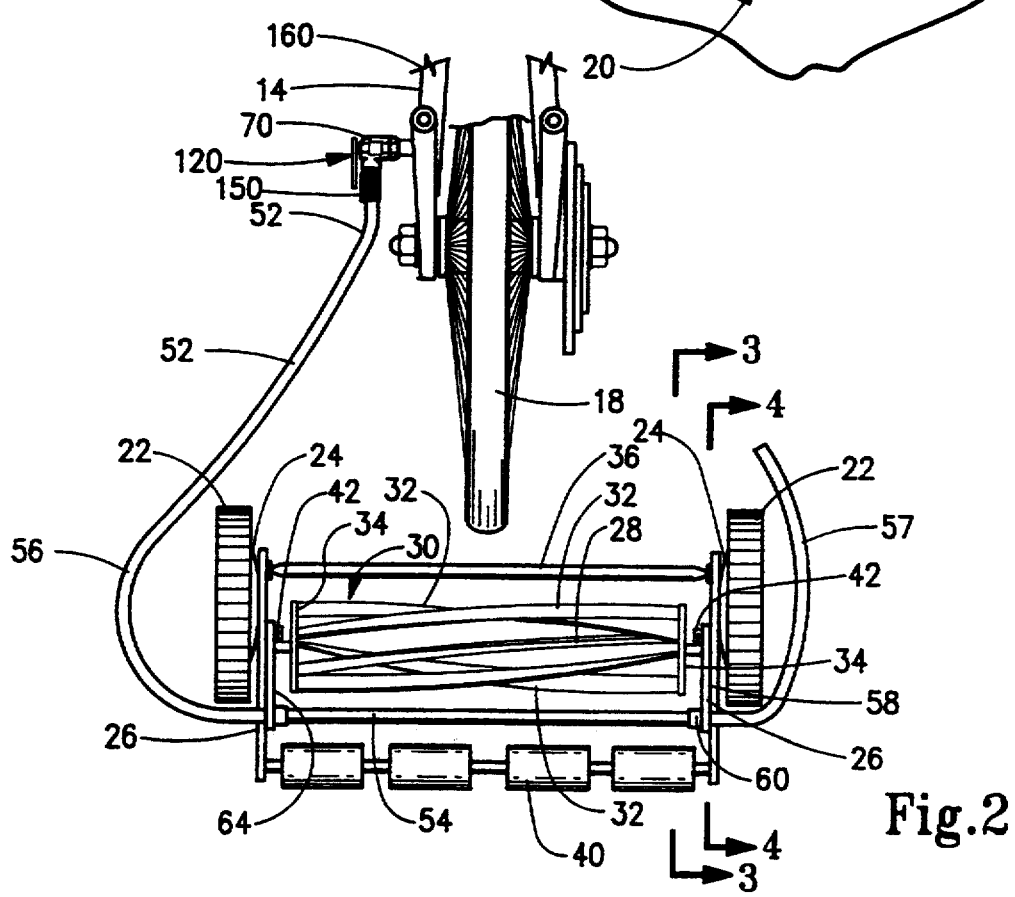
FIG. 2 is a top plan view of the mowing apparatus shown in FIG. 1 showing the attachment thereof to the bicycle.
Figure 3:
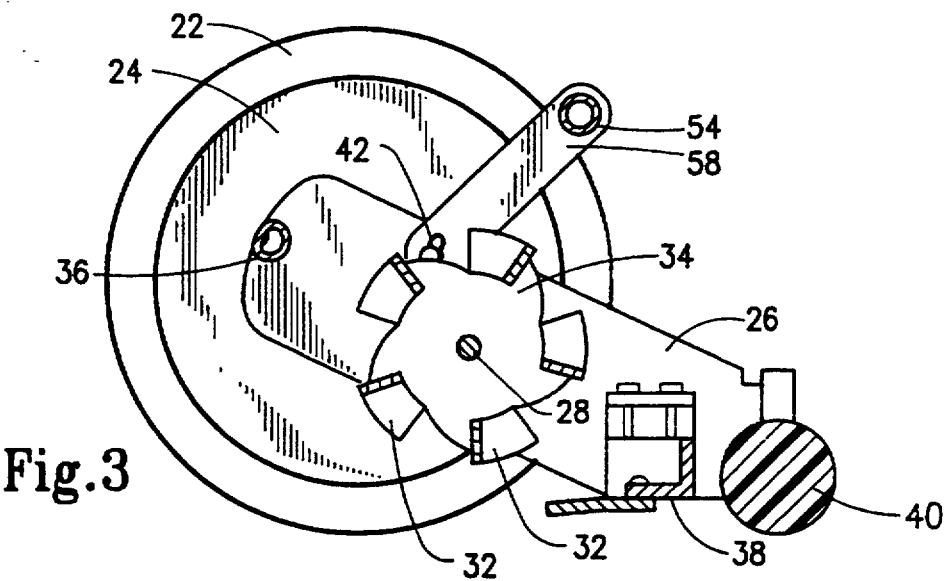
FIG. 3 is a cross-sectional view taken about lines 3—3 of FIG. 2.
Figure 4:
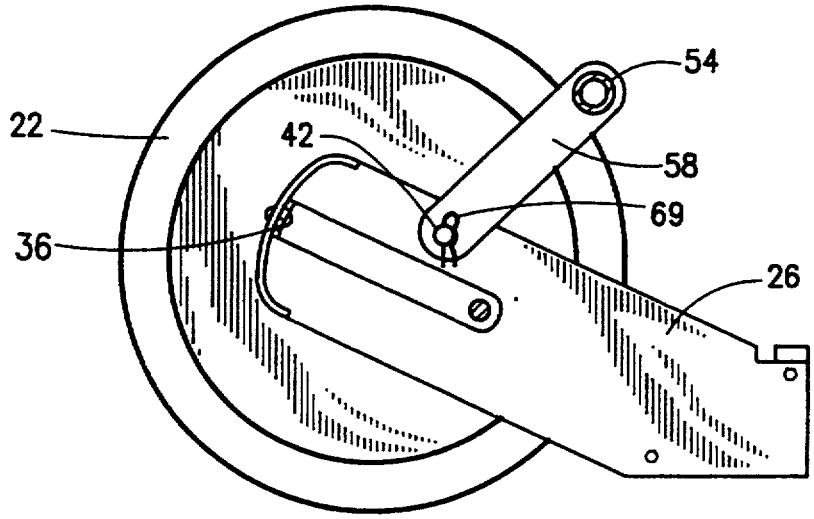
FIG. 4 is a cross-sectional view taken about lines 4—4 of FIG. 2.
Figure 5:
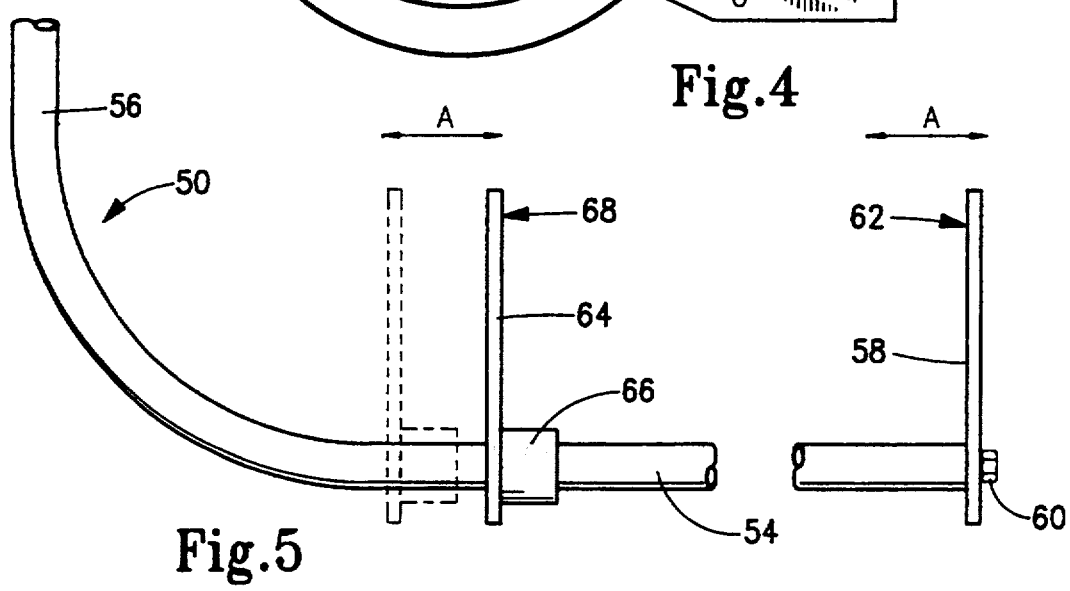
FIG. 5 is a top view in elevation and broken-away of the rear portion of the draw-bar shown in FIGS. 1 and 2.

Mowing assembly 20 in this exemplary embodiment preferably is a standard reel-type mower of known construction. Generally, the structure of reel-type mowing assembly 20 is shown in FIGS. 2-4. Here, mowing assembly 20 includes a pair of drive wheels 22 mounted on side frames 24, and a rearwardly extending bracket 26 is disposed on each side frame 24. A reel-type blade assembly 30 includes a plurality of cutting elements in the form of arcuate blades 32 each extending along an imaginary cylindrical surface between end plates 34. End plates 34 are rotatably journaled on an axle 28 which is interconnected to a gear assembly (not shown) in drive wheels 22 so that, as drive wheels 22 rotate, blade assembly 30 is driven to cut the vegetation, all as is known in the art.

Rigidifying frame elements 36 and 38 extend between brackets 26, and a ground roller 40 is rotatably journaled between the rearward end portions of brackets 26. Brackets 26 each include a mounting post 42 with mounting posts 42 being in opposed facing relationship to one another as is shown in FIG. 2. Mounting posts 42 are adapted to receive the ends of a handle assembly (not shown) so that a user may optionally detach the mowing apparatus from bicycle 12, attach the handle assembly and push the mowing apparatus across the vegetated surface. Draw-bar 50 of the present invention is constructed to mount to these existing, standard mounting posts 42, although it should be appreciated that for a given mounting structure of mowing apparatus 20, the actual mounting of draw bar 50 could be accomplished in any convenient manner without departing from the scope of this invention.

Draw-bar 50 has a forward or proximal end portion 52 fastened to connector 70 and a rear portion 54 extends transversely of the direction of travel and is oriented generally parallel to axle 28 of blade assembly 30. An arcuate central portion 56 extends between transverse rear portion 54 and proximal portion 52 and is configured so as not to interfere with wheels 22 of mowing assembly 20 when in the mounted state. Draw bar 50 terminates opposite connector 70 in a curved guard portion 57 which extends forwardly of the associated wheel 22 and thus the cutting elements, that is, blade assembly 30. Thus, curved guard portion 57 is a continuous extension of transverse rear portion 54, although, as described below, this guard portion could be provided by an auxiliary piece releasably securable to the transverse portion. Together, curved guard portion 57 and arcuate central portion 56 provides guards in the form of outboard bumpers that help deflect the mower assembly 30 from impacting rocks, trees, walls, etc. which may be encountered during use. A first mounting bracket 58 has a sleeve-like enlarged collar 60 that is slidably received on the transverse length of rear portion 54 of draw-bar 50. Mounting bracket 58 includes an opening 62 sized to matably engage a post 42 on bracket 26 of mowing assembly 20. A second mounting bracket 64 also has an enlarged annular collar 66 slidably received on transverse length of rear portion 54 so that brackets 58 and 64 may move toward and away from bracket 58 in the direction of arrows "A" shown in FIG. 5. Mounting bracket 64 includes an opening 68, similar to opening 62, so that opening 68 may matably engage the other of mounting posts 42. Once engaged with the post 42, each of brackets 58 and 64 may be secured by a retaining clip, such as retaining clip 69 shown in FIG. 4. Brackets 58 and 64 accordingly act as mower mounts to draw bar 50.

Draw-bar 50 is attached to bicycle 12 by means of connector 70 as shown in FIGS. 1 and 2 which acts as a bicycle mount. The structure of connector 70 is best shown in FIGS. 6-8 where it may be seen that connector 70 includes a split central body or housing formed by a first section 72 adapted to receive a clamp piece 80 and a second section 100 adapted to mount onto draw-bar 50. As is shown in FIGS. 7 and 8, first housing section 72 includes a tooth shoulder portion 74 surrounding cylindrical portion 76. Shoulder 74 is provided with a plurality of radially extending rib-like teeth 75, and first housing piece 72 includes an enlarged rectangular bore 78 extending axially therethrough. Clamp element 80 is U-shaped in construction to have a pair of parallel wings 82 and 84 each respectively provided with an opening 83 and 85. A U-shaped resilient pad 86 is affixed in the arcuate web portion 87 of clamp element 80 and is operative, along with arcuate wall 73 of first housing section 72 to engage a frame element 160 of bicycle 12. Opening 83 is square-shaped while opening 85 is circular and of smaller size so that a transverse retaining nut 90 may be removably positioned and retained in openings 83 and 85. Nut 90 is elongated and is square-shaped in cross-section so that it is dimensioned to be matably received in opening 83. One end of nut 90 is defined by a cylindrical post 92 that is dimensioned to fit into opening 85 so that the opposite ends of nut 90 are flush, respectively, with wings 82 and 84. Nut 90 is provided with a threaded bore 94.

Second housing section 100 includes a main body 102 that terminates in a toothed rim 104 having a plurality of radially extending rib-like teeth 105. As is best shown in FIG. 8, body portion 102 includes an axially extending cylindrical bore portion 106 sized to receive cylindrical portion 76 of first housing section 72. A rectangular bore 108 extends interiorly of body portion 102 from bore 106, and is sized the same as bore 78 of first housing section 72 as extension thereof so that wings 82 and 84 may be slidably received therein. A smaller cylindrical recess 110 is located co-axially with bore 106 at an opposite axially end of body portion 102. Recess 110 and rectangular bore 108 are interconnected by axially extending cylindrical bore 112.

A fastening piece is operative to interconnect first and second housing sections 72 and 100 of connector 70 as well as clamp element 80 thereof. As is best seen in FIGS. 7 and 8, fastening piece 120 has an elongated threaded shaft 124 extending from boss 122. A washer 130 may be received on shaft 124 and shaft 124 may be inserted through recess 110 and bore 112 so that the free end 126 of shaft 124 may threadably engage threaded bore 94 of transverse nut 90. Boss 122 is connected to a head portion 132 of fastening piece 120 and includes an elongated, radially extending arm portion 134 operative to permit a user to gain mechanical advantage. As shaft 124 is slidably advanced into nut 90 by rotating head 132 in a clockwise manner, washer 130 and boss 122 will be advanced into and received by recess 110. Continued advancement then draws clamp element 80 towards second housing piece 100 thus trapping first housing piece 72 therebetween as well as frame element portion 160 of bicycle frame 14. Continued advancement clamps frame element 160 between pad portion 86 of clamp element 80 and arcuate wall 73 of first housing section 72. Furthermore, the tightening of fastening piece 120 causes radial teeth 75 and 105 to engage one another thus preventing relative rotation of first and second housing sections 72, 100. Nonetheless, radial teeth 75 and 105 permit relative rotational positioning of first and second housing sections 72, 100 when fastening piece 120 is loosened. Thus, fastening piece 120 acts as a drive element operative to advance and retract the clamp element 50.

With reference to FIGS. 2, 6 and 7, it may be seen that second housing section 100 includes a radially extending mounting post 140 which is sized to mate with a resilient spring element 150 so that spring element 150 may be held thereon by means of pin 142 received in bore 144 extending transversely through post 140. The opposite end of resilient element 150 matably receives proximal end 52 of draw-bar 50 with proximal end portion 52 and resilient element 150 being secured in engagement by means of a pin 152.

The mounting of draw-bar 50 and thus mowing apparatus 10, onto frame element 160 of bicycle frame 14 may now be more readily understood. To accomplish this mounting, connector 70 is disassembled and clamp element 80 is positioned around frame element 160. Transverse nut 90 is then mounted in clamp element 80 and wing portions 82 and 84 are mated in bore 78 of first housing section 72. Second housing section 100 is then positioned on first housing section 72 so that rim 104 faces shoulder 74. Washer 130 is located on shaft 124 of fastening piece 120, and shaft 124 is inserted through bore 112 until end portion 126 engages threaded bore 94 of nut 90. Fastening piece 120 is then rotated to tighten the assembly until teeth 75 and 105 are close to engagement. At this point, the user may relatively rotate second housing piece 100 on first housing piece 72 to bend resilient element 150 thus tending to force draw-bar 50 toward the support surface. While in this pre-stressed state, fastening piece 120 is further rotated to engage teeth 75 and 105 to lock first and second housing sections 72, 100 in this relative position. Since the transverse rear portion 54 of draw-bar 50 is, however, held in position above support surface 13 by mowing assembly 20 and brackets 58 and 64, the stressing of resilient element 150 causes it to bend so that transverse distal portion 54 of draw-bar 50 places a normal load force on brackets 58 and 64 thus holding mower assembly 20 against support surface 13. It should now be understood that the magnitude of this normal force may be adjusted by the relative rotation of first and second housing sections 72, 100 along with the spring constant of resilient element 150.

Figures 9, 10:
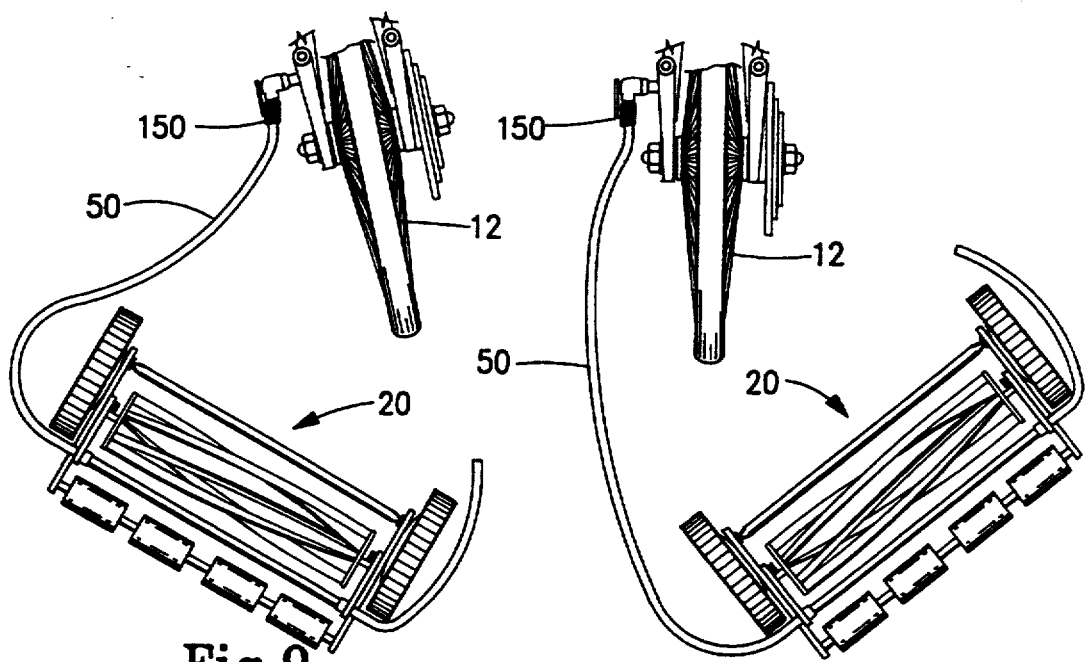
FIG. 9 is a top plan view, in diagrammatic form, showing the bicycle and mowing apparatus in a left-turn configuration.
FIG. 10 is a top plan view, in a diagrammatic form, showing the mowing apparatus and bicycle in a right-turn configuration.

Furthermore, the use of resilient element, such as coil spring 150, provides further advantage when turning bicycle 12 during use. As is shown in FIGS. 9 and 10, resilient element 150 allows draw-bar 50 to flex to the left and right of its normal position thereby allowing mowing assembly 20 to articulate in a left arc (shown in FIG. 9) or a right arc (shown in FIG. 10) without being required to stay directly behind bicycle 12 as it is advanced across the vegetated surface 13. As a user comes out of a turn, resilient element 150 will bring mowing assembly 20 back in line directly behind bicycle 12.

Figure 11:
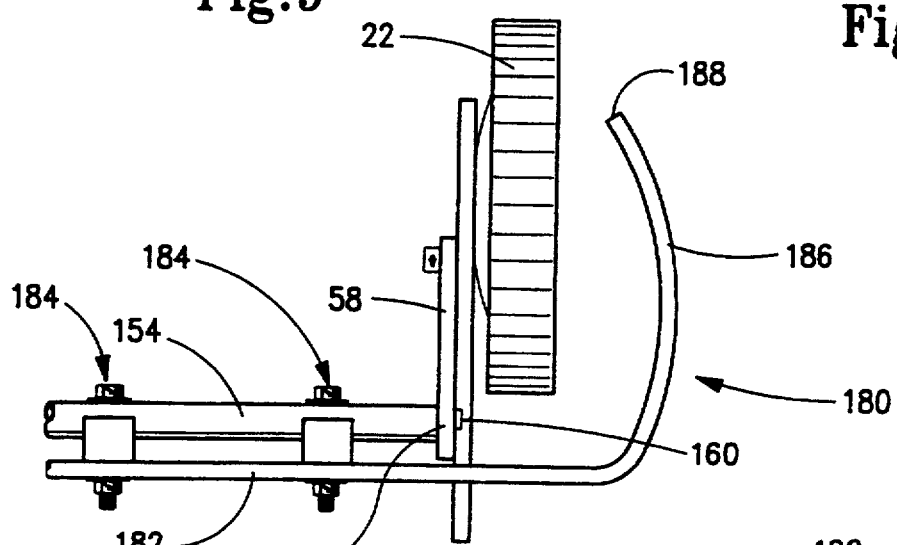
FIG. 11 is a top plan view of an auxiliary guard piece which may be attached to the draw-bar of FIGS. 1 and 2.

An auxiliary guard 180 is shown in FIG. 11 as an alternative to the curved end guard portion 57 discussed above. Here, the draw bar terminates in a transverse rear portion 154 that has distal end 156 directly secured to mounting bracket 58 by a bolt 160. Auxiliary guard 180 is J-shaped in configuration and includes a leg portion 182 that is adapted to extend alongside transverse draw-bar portion 154 and be secured thereto by means of nut and bolt assemblies 184. A hook portion 186 is arcuate in shape to extend around wheel 22 of mowing assembly 20 to terminate in a free end 188 immediately forwardly of wheel 22. Guard 180, when used, acts to prevent damage to mowing assembly 20 should it get too close to a wall, fence, tree or other object during the mowing of the vegetated support surface.

Figure 12:
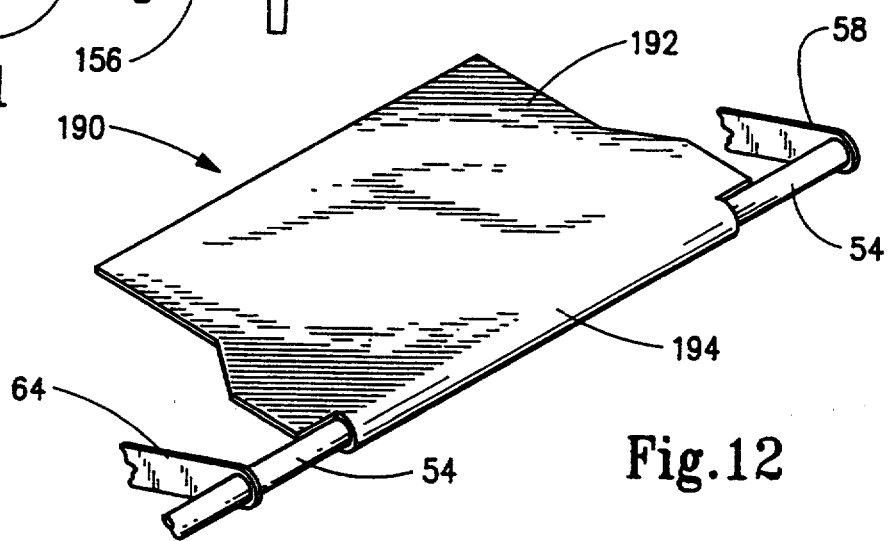
FIG. 12 is a perspective view of an auxiliary shield which may be attached to the draw-bar of FIGS. 1 and 2.
Figure 13:
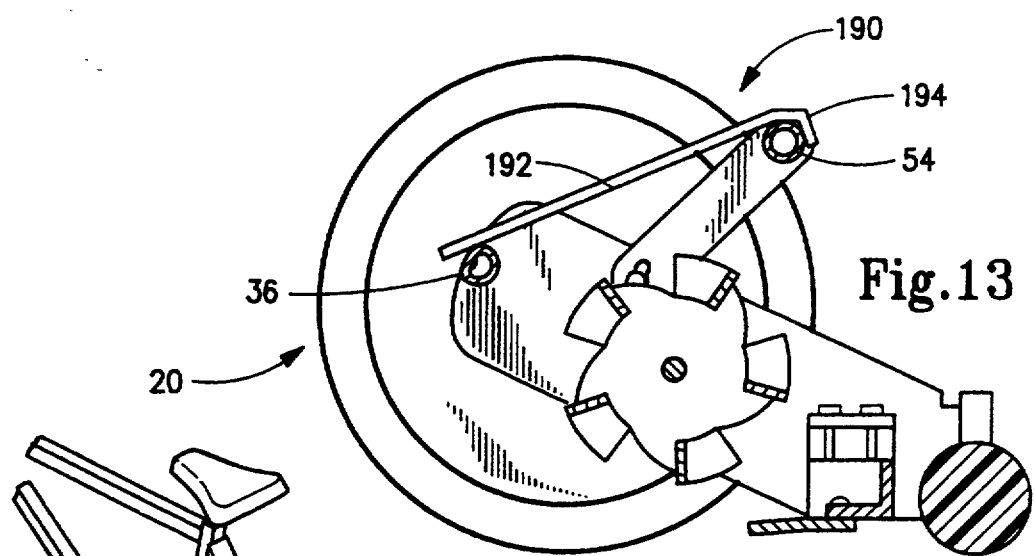
FIG. 13 is a cross-section view, similar to FIG. 3, showing the shield of FIG. 11 attached to the draw-bar and mowing apparatus.

An auxiliary grass shield 190 may also be used, as is best shown in FIGS. 12 and 13. Here, grass shield 190 is in the form of a flat plate defining a central portion 192 that terminates, at one transverse edge, and a hook portion 194 that is sized to spring-fit onto transverse portion 54 of draw-bar 50. Central section 192 extends forwardly, for example, to rest on a rigidifying element 36 of mowing assembly 20, as is shown in FIG. 13.

Figure 14:
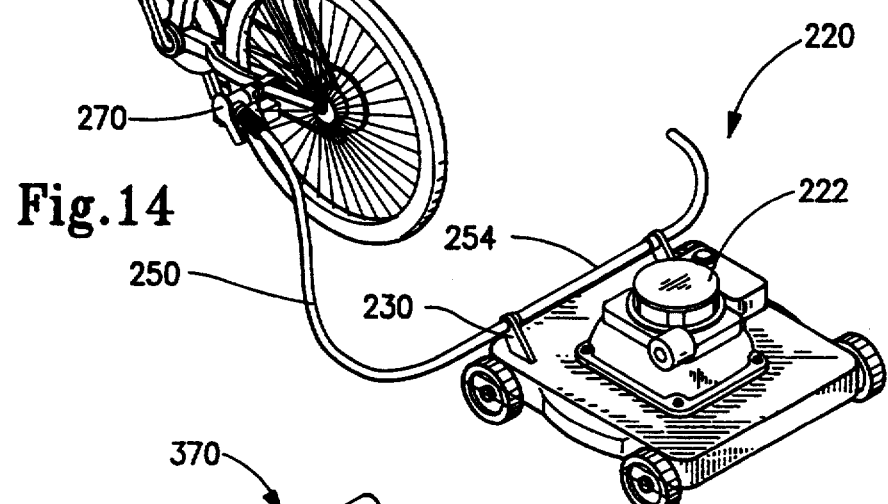
FIG. 14 is a perspective view of a draw-bar similar to the draw-bar shown in FIGS. 1 and 2 but in use with a rotary motor.

A first alternative exemplary embodiment of the present invention is shown in FIGS. 14 and 15 where it may be appreciated that the present invention may incorporate a rotary-type mowing assembly 220 of a standard type that is power driven by a combustion engine, such as engine 222. Here, the structure of draw-bar 250 is similar to that as described with respect to draw-bar 50, except that draw-bar 250 must be sized to accommodate the dimensioning of rotary mowing assembly 220 so that it may be connected by draw-bar 250 to bicycle 12 by means of connector 270 that is the same as connector 70, described above. Here again, draw-bar 250 includes a transverse portion 254 that extends between brackets 258 and 264 that are respectively attached to the normal handle brackets 236 of mowing assembly 230. Transverse portion 254 terminates in forwardly curved guard portion 257. In FIGS. 14 and 15, rotary mower 220 is shown to be towed backwards relative to its normal advancement by a handle assembly (not shown) that typically is mounted to brackets 230 and 236. Naturally, it would be possible to reverse mower 220 and tow it in a forward direction, but this would necessitate elongating connector bar 250 to accommodate the size of mower 220.

Figure 16:
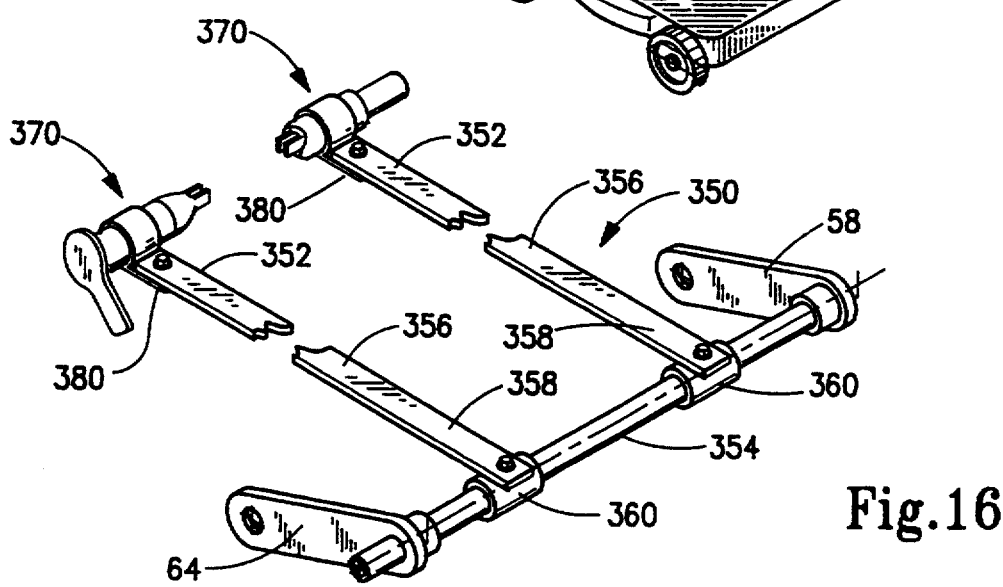
FIG. 16 is a perspective view of another alternative exemplary embodiment of a draw-bar structure according to the present invention.

An alternative embodiment of the draw-bar assembly is shown in FIGS. 16 and 17. Here, draw-bar 350 has a transverse portion 354 that extends between mounting brackets 58 and 64, described above, and attachment to mowing assembly 20 is the same. Here, however, arcuate central portion 56 is eliminated and connection is made to a pair of frame elements, such as frame elements 360 on opposite sides of bicycle 12. More specifically, a pair of connectors 370 of similar construction to connector 70 are provided for attachment to frame elements 360. Each connector 370, however, includes a radial attachment plate 380 instead of radial post 140 described with reference to connector 70. Longitudinal connecting pieces 356 have proximal end portions 352 that are secured to mounting plates 380 in any convenient manner, such as by screws, rivets, nut and bolt sets and the like. The distal end portions 358 are each secured to sleeves 360 slidably received on transverse draw-bar portion 354. Each of central portions 356 of draw-bar 350 are formed of a stiff, yet flexible, resilient material, such as glass reinforced resin, so that they may be arcuately bowed, as is shown in FIG. 17, to apply the downwardly directed or normal force at the rear of mowing assembly 20. While this structure is quite suitable in applying the normal force to help hold mowing assembly 20 against the vegetated surface 11 to be mowed, it does not have the equal advantage of turning radius as described with respect to the preferred exemplary embodiment in FIGS. 1-8, above.

Finally, an alternative embodiment to connector 70 is shown in FIGS. 18, 19 and 20. Here, connector 470 is formed as a single body element 472 having a hook-shaped end 474 provided with a friction pad 476 that faces a wall 478 to define a cavity 475. A clamp element 480 is located on the end of threaded shaft 424 of fastening piece 420 which includes an enlarged knurled head 430 which may be rotated to advance clamp element 480 toward and away from hooked portion 474 thereby to clamp a bicycle frame element therebetween. An angled mounting post 490 extends laterally out of body portion 472 for releasable connection to a connector bar 450.

In this embodiment, connector 470 is adapted to remain on the bicycle 12 when the mowing assembly is removed. Accordingly, a modified proximal end portion for the connector bar is shown. Here, connector bar 450 has a proximal end portion 452 formed by a sleeve 460 that may be mated onto angle post 490 and held in position by means of releasable clip 462. A resilient element, such as spring 464 is received in sleeve 460 and is held in position by means of a pin 466. The opposite end of spring 464 is telescopically received in the end of arcuate central portion 456 of draw-bar 450 and is held in position by means of a pin 458. Here, it should be apparent that the user may simply connect and disconnect draw-bar 450 from connector 470 after connector 470 has been secured to the bicycle. This is accomplished by releasing clip element 462 so that sleeve 460 may be removed from mounting post 490. Reconnection is accomplished by the reverse operation, and it should be appreciated that the angling of shaft 490 allows for the pre-stressing of connector bar 450 by creating a bending or flexing of spring element 464 so that a normal force is applied to the mowing apparatus, as described above. Here, however, the adjustment of the normal force is not provided for.

From the foregoing, it should be appreciated and understood that a variety of different connector bars may be used without departing from the scope of this invention. Furthermore, different mounts for attaching the connector bar to the bicycle frame may be employed. Likewise, it would be possible to attach a connector bar to frame elements of the bicycle other than those described above, if desired. It should further be recognized that different types of resilient elements may be employed and located at different positions along the connector bar. Thus, the resilient element could be located at any portion of the connector bar from its proximal end to its distal end. Finally, a variety of different attachment brackets for securing the connector bar to the mowing assembly, as well as different types of mowing assemblies, may be employed. Here, the skilled person in this field should recognize that it is possible to customize either the mowing assembly for such mounts or, alternatively, to employ mounting brackets that interface with existing attachments provided on conventional mowing assemblies.

Accordingly, the present invention has been described with some degree of particularity directed to the exemplary embodiments of the present invention. It should be appreciated, though, that the present invention is defined by the following claims construed in light of the prior art so that modifications or changes may be made to the preferred embodiment of the present invention without departing from the inventive concepts contained herein.

We claim:

1. A mowing apparatus adapted to mount to a frame member of a vehicle in order to be advanced by the vehicle along a line of travel on a support surface and operative to cut vegetation such as in a user's lawn, comprising:

(a) a mower assembly including cutting elements which act to cut vegetation when in an active state;

(b) a connector operative to releasably mount onto a frame member of said vehicle; and (c) a draw-bar interconnecting said mower assembly and said connector so that said draw-bar is at a selected orientation relative to said vehicle, said draw-bar including a resilient element operative to permit flexing of said draw-bar relative to said vehicle and to exert a restorative force for returning said draw-bar to the selected orientation when said draw-bar is flexed.

2. A mowing apparatus according to claim 1 wherein said resilient element permits articulation of said mowing assembly out of the line of travel of said vehicle.

3. A mowing apparatus according to claim 1 wherein said resilient element is pre-flexed relative to said vehicle to apply a load force on said mowing apparatus against said support surface.

4. A mowing apparatus according to claim 3 wherein said connector allows adjustable positioning of said draw-bar whereby the load force may be selectively varied.

5. A mowing apparatus according to claim 1 wherein said draw-bar is constructed of a stiff, yet resilient material.

6. A mowing apparatus according to claim 5 wherein said resilient material is glass reinforced resin.

7. A mowing apparatus according to claim 1 wherein said resilient element is a spring member secured to said connector.

8. A mowing apparatus according to claim 1 wherein said draw-bar is arcuate in shape and interconnects to said mowing assembly rearwardly of said cutting elements.

9. A mowing apparatus according to claim 1 including a shield panel adapted to connect onto said draw-bar and operative to deflect cut vegetation away from the user.

10. A mowing apparatus according to claim 1 wherein said mowing assembly is a reel-type mower having surface-engaging wheels driveably connected to said cutting elements.

11. A mowing apparatus according to claim 1 wherein said mowing assembly is a power mower having a power source operative to drive said cutting elements independently of the advancement of said mowing assembly.

12. A mowing apparatus according to claim 1 wherein said connector is formed as a clamp assembly including a central body, a clamp element relatively movable with respect to said central body and a drive element operative to advance and retract said clamp element whereby said connector may releasably engage said frame element.

13. A mowing apparatus according to claim 12 wherein said central body is formed in two body sections relatively rotatable with respect to one another, each of said body sections provided with cooperating teeth adapted to engage one another whereby said body sections may be selectively rotated and locked into position by said cooperating teeth.

14. A mowing apparatus according to claim 1 wherein said draw-bar has a proximal end portion adapted to be releasably fastened to said connector, a distal end portion adapted to be fastened to said mower assembly, and a central portion extending between said proximal and distal end portions, said resilient element being located in said central portion.

15. A mowing apparatus according to claim 14 wherein said proximal end portion and said central portion are separate tubular members, said resilient element interconnecting said proximal end portion and said central portion.

16. A mowing apparatus adapted to mount to a frame member of a vehicle in order to be advanced by the vehicle along a line of travel on a support surface and operative to cut vegetation such as in a user's lawn, comprising:

(a) reel-type mower including a pair of spaced-apart wheels, a mower frame between said wheels and cutting elements disposed in said frame and operative to cut vegetation when said mower is advanced across a vegetated support surface;

(b) a connector operative to releasably mount onto a frame member of said vehicle; and (c) a draw-bar interconnecting said mower and said connector, said draw-bar including a resilient element operative to apply a restorative force when flexed thereby to bias said mower downwardly against said support surface with a biasing force.

17. A mowing apparatus according to claim 16 including a pair of connectors operative to releasably mount onto opposed frame members of said vehicle and a pair of draw-bars, each said draw-bar mounted to said mower on opposite sides thereof and interconnecting said mower to a respective said connector, each of said draw-bars including a resilient element operative to bias said mower downwardly against said support surface.

18. A mowing apparatus according to claim 17 wherein each of said draw bars is constructed of a stiff yet resilient material.

19. A mowing apparatus according to claim 16 including a pair of opposed bracket elements mounted on said mower frame and wherein said draw-bar includes a transverse portion extending between said bracket elements and a central portion extending between said transverse portion and a proximal portion fastened to said connector.

20. A mowing apparatus according to claim 19 wherein said central portion is arcuate in shape and extends from a first end of said transverse portion on one side of said mower.

21. A mowing apparatus according to claim 20 wherein said draw-bar includes a guard portion extending from a second end of said transverse portion on another side of said mower.

22. A mowing apparatus according to claim 21 wherein said guard portion is formed as a continuous curved extension of said transverse portion.

23. A mowing apparatus according to claim 21 wherein said guard potion is an auxiliary curved element releasably securable to said transverse portion.

24. A mowing apparatus according to claim 19 wherein said bracket elements are releasably mountable to said mower frame.

25. A mowing apparatus according to claim 19 including a shield panel adapted to be fastened onto said transverse portion of said draw-bar to extend in a position above said cutting elements.

26. A mowing apparatus according to claim 16 wherein said connector is formed of at least two sections, a first section adapted to mount on said vehicle and a second section adapted to fasten to said draw-bar, said first and second sections being relatively movable with respect to one another whereby said resilient element may be stressed to vary the biasing force.

27. A mowing apparatus according to claim 26 including interlocking tooth elements on said first and second sections whereby said first and second sections may be releasably secured at a selected relative rotation.

28. A draw-bar assembly adapted to interconnect a mower assembly and a bicycle whereby said mower assembly may be advanced across a vegetated support surface to cut said vegetation wherein said mower assembly includes a mower frame disposed on rotatable mower wheels and wherein said vehicle includes frame elements, said draw-bar assembly comprising:
  (a) a mower mount operative to releasably secure onto said mower frame;
  (b) a bicycle mount operative to releasably secure onto a frame element of said bicycle; and
  (c) a draw-bar interconnecting said mower mount and said bicycle mount, said draw-bar including a resilient portion operative to permit flexing of said draw-bar relative to said vehicle while applying a restorative force on said draw-bar when said draw-bar is so flexed.

29. A mowing apparatus adapted to mount to a frame member of a vehicle in order to be advanced by the vehicle along a line of travel on a support surface and operative to cut vegetation such as in a user's lawn, comprising:
  (a) a mower assembly including cutting elements which act to cut vegetation when in an active state;
  (b) a connector operative to releasably mount onto a frame member of said vehicle; and
  (c) a draw-bar interconnecting said connector and said mower assembly at a point rearward of said cutting elements, said draw-bar being arcuate in shape and terminating opposite said connector in a curved guard portion extending forwardly of said cutting elements.

* * * * *